US005524126A

United States Patent [19]
Clewer et al.

[11] Patent Number: 5,524,126
[45] Date of Patent: Jun. 4, 1996

[54] SYMBOL TIMING RECOVERY USING FIR DATA INTERPOLATORS

[75] Inventors: Richard Clewer, Ijamsville; Janavikulam Anandkumar, Gaithersburg; Andrew Macdonald, Damascus, all of Md.

[73] Assignee: Hughes Electronics, Los Angeles, Calif.

[21] Appl. No.: 341,891

[22] Filed: Nov. 15, 1994

[51] Int. Cl.$^6$ ........................................ H04L 7/00
[52] U.S. Cl. ........................ 375/355; 375/232; 375/373
[58] Field of Search ................................. 375/355, 261, 375/340, 232, 233, 235, 373, 375; 364/724.19, 724.20, 724.1; 327/141

[56] References Cited

U.S. PATENT DOCUMENTS

| | | | |
|---|---|---|---|
| 4,285,061 | 8/1981 | Ho | 375/355 |
| 4,411,000 | 10/1983 | Kustka | 375/355 |
| 4,571,732 | 2/1986 | Pirani et al. | 375/232 |
| 5,018,166 | 5/1991 | Tjahjadi et al. | 375/355 |
| 5,311,546 | 5/1994 | Paik et al. | 375/232 |
| 5,425,057 | 6/1995 | Paff | 375/235 |

*Primary Examiner*—Stephen Chin
*Assistant Examiner*—Tesfaldet Bocure
*Attorney, Agent, or Firm*—Gordon R. Lindeen, III; Wanda Denson-Low

[57] ABSTRACT

A symbol timing recovery method and device which aligns the received data with a free-running symbol clock such that the aligned data sampling error is minimized. The symbol timing recovery process consists of detecting the timing phase error between the transmitters symbol clock and the receiver symbol clock, filtering the error, and then using the filtered error signal to control a block which changes the phase of the data relative to the timing reference signal. A data zero-crossing phase error detector drives a loop filter whose most significant bits form the address of the FIR coefficient ROM, which allows the FIR to interpolate data at sub-symbol resolution. The FIR coefficients are then used to synchronize the received data with the receiver clock.

14 Claims, 6 Drawing Sheets

SYMBOL TIMING RECOVERY USING FIR DATA INTERPOLATORS

BACKGROUND OF THE INVENTION

In digital communication, digital receivers generally require a digital clock synchronized to the received bit stream to control timing of the output of the bit stream. However, the clocks of the transmitter and receiver are generally not synchronous because the transmitter and receiver are separated geographically and because the transmitted signal experiences frequency changes due to noise and other transmission factors.

Products using an I-Q demodulator, such as a modem, need the ability to synchronize received data having widely varying phase. Symbol timing recovery, also known as bit timing recovery, is conventionally performed by extracting the time clock directly from the bit stream and correcting the phase of the extracted clock signal to line up with the demodulator data. According to such systems, the recovered clock signal is adjusted until it is in phase with the received signal.

In a conventional bit timing recovery system, a modulated carrier signal at intermediate frequency is received by a demodulator and converted to baseband. The signal is separated into its inphase and quadrature components, where the inphase branch determines the polarity of the bit transitions and the quadrature channel determines the magnitude of the bit-timing error. An inphase integrator and quadrature integrator adjust the clock of the received signal based on a phase error estimate, and the adjusted clock signal is converted to a digital signal by analog-to-digital converters. The digital inphase and quadrature signals then enter a phase error detector where the polarity and magnitude of the bit-timing error is determined. The phase error estimate is used to control a voltage controlled oscillator which adjusts the received analog clock signal such that it is in phase with the demodulator clock.

The disadvantage of this kind of conventional symbol timing recovery system is that phase error correction is performed on the analog signal and an analog implementation is not capable of handling the range of frequencies that a completely digital system can process. Shifting the phase prior to A/D conversion limits the range of frequencies over which the signal may be tuned. Generally, an analog signal is tuned over a 2 to 1 range in frequency, and beyond that range the voltage controlled oscillator used for phase error correction would have to be changed or additional VCOs having higher frequency ranges added to accommodate the greater frequencies. In order to achieve a wider frequency range more hardware would have to be added to the demodulator, thus making it larger, more complex, and more costly.

The convention symbol timing recovery devices does provide some advantages, namely the ability to receive and process data from a variety of transmitter devices. Nevertheless, the prior art symbol timing recovery devices do not provide the advantage of relatively simple construction in conjunction with the ability to tune over a virtually unlimited frequency range.

SUMMARY OF THE INVENTION

According to the invention, a symbol timing recovery device is provided which synchronizes the receiver symbol clock to that of the transmitter symbol clock by keeping the receiver symbol clock steady and digitally delaying or advancing the data using a finite impulse response (FIR) interpolator or filter. The symbol timing recovery device of this invention comprises a FIR filter which receives digital inphase and quadrature data. Data is clocked into the FIR shift registers at a sampling rate of two samples per symbol. The FIR filter then takes the data contained in its shift register and performs a convolution by multiplying the contents of each shift register by a plurality of symbol timing recovery FIR coefficients which are based on the sinc function.

The filtered signal from the FIR filter is then separated into its sampling and zero components and input to a phase error detector which determines the polarity and magnitude of the phase error. The phase error signal from the phase error detector is integrated in the loop filter, i.e. successive phase error values are added to create an average error based on successive error calculations. This integrated phase error is monitored by an integrator centering control which determines when the phase error output has reached a minimum or maximum value and must be offset to zero. When this occurs, the integrator is offset to zero, causing the FIR coefficients to be offset to zero as well.

Due to this offset, the output data sequence from the FIR filter is modified and a "hold" or "skip" signal must be generated to ensure that the proper sampling points are used for subsequent data. At these instances, the free-running clock phase is adjusted to match the data sequence. This adjusted clock is thereby the recovered clock.

The most significant bits of the integrated phase error signal are then rounded to create threshold values which determine which coefficient addresses will be used by the FIR filter. Based on the selected coefficients, the FIR output is aligned with the free running clock of the receiver.

In accordance with the invention, a method of symbol timing recovery is provided which aligns the received data with a free-running symbol clock such that the aligned data sampling error is minimized. This method comprises detecting the timing phase error between the transmitter symbol clock and the receiver symbol clock based on the differences in current and previous symbol ideal I and Q values and the intermediate zero-crossing values. The phase error signal is then integrated with a previously calculated phase error and monitored to determine whether the phase error output reaches a minimum or maximum value. If the signal is at a maximum value, the integrator centering logic offsets the coefficient address of the FIR filter to zero.

In the case of zero offset, "hold" or "skip" signals are generated so that the symbol is held or processed to account for a reverse in the sampling and zero points due to the offset. The most significant bits of the phase error signal are then rounded to create threshold values which determine which coefficient addresses will be used by the FIR filter. Based on the selected coefficients, the FIR output is aligned with the free running clock of the receiver.

As pointed out in greater detail below, the symbol timing recovery device and method of this invention provides important advantages. The symbol timing recovery device and method of this invention perform phase synchronization entirely in the digital domain. Thus, this invention can perform synchronization on a frequency range limited only by the constraints of the hardware. This means that a device of unlimited frequency can be made of relatively simple hardware; thus, it takes up less space and can be made at a lower cost.

The invention itself, together with further objects and attendant advantages, will best be understood by reference to the following description, taken in conjunction with the accompanying drawings.

DETAILED DESCRIPTION

Figure 1:
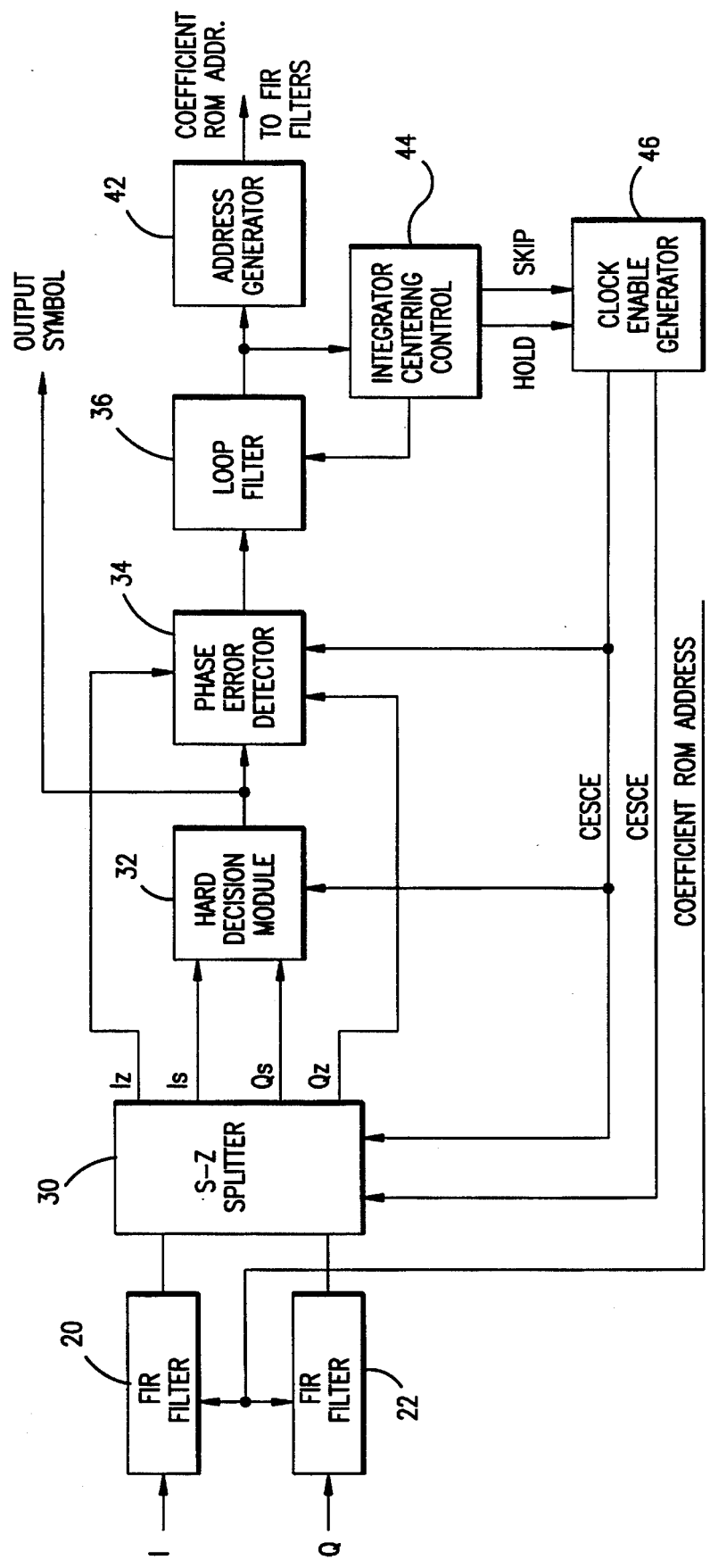
FIG. 1 is a block diagram of a symbol timing recovery device in accordance with this invention.
Figure 2:
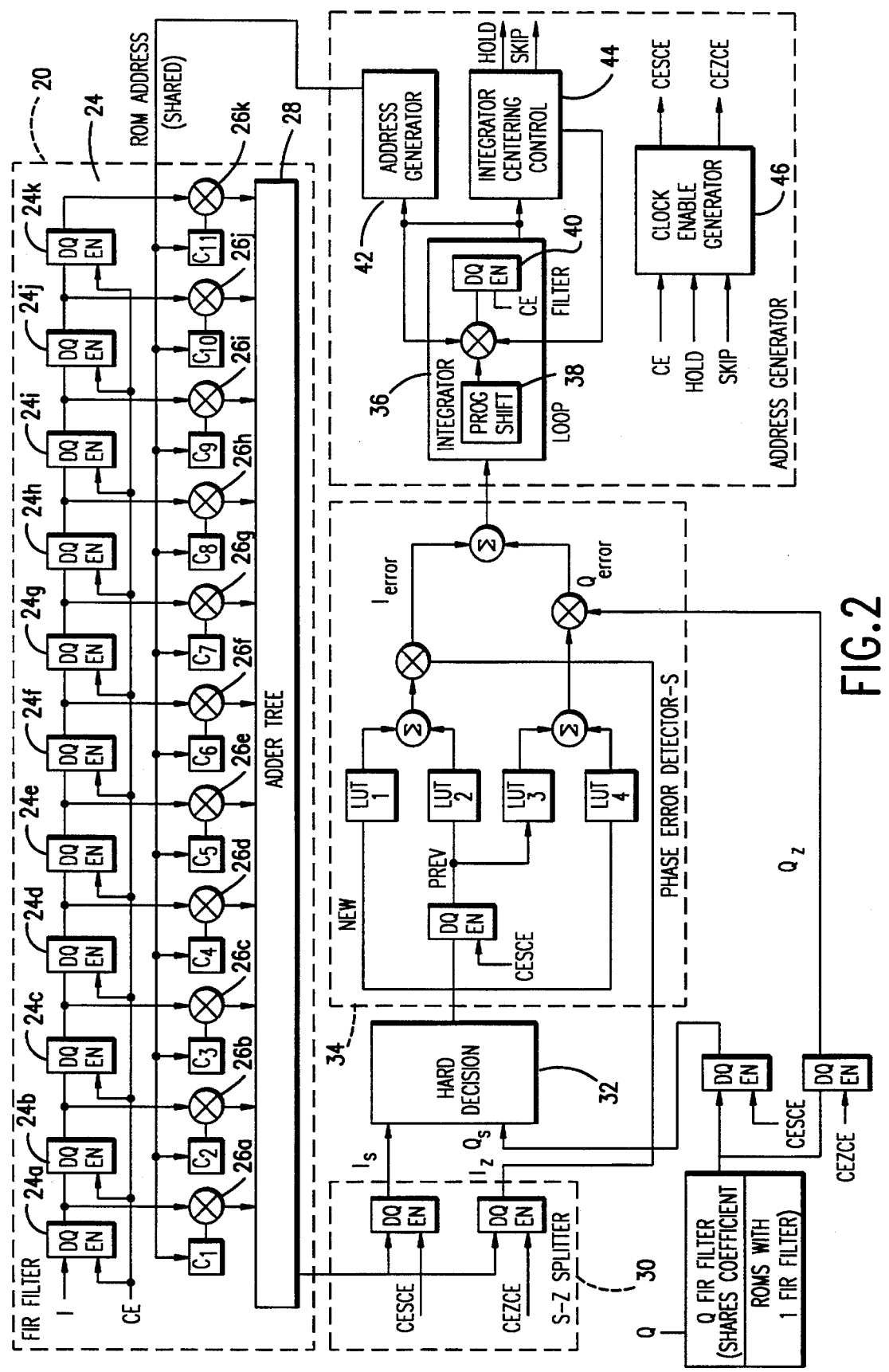
FIG. 2 is functional diagram of the symbol timing recovery device shown in FIG. 1.

Turning now to the drawings, FIG. 1 shows a block diagram of the symbol timing recovery (STR) device in accordance with the preferred embodiment of this invention, and FIG. 2 shows a functional diagram of the device of FIG. 1. As shown in FIG. 1, inphase data I and quadrature data Q is input to a data phase controllers which are finite impulse response (FIR) filters 20 and 22, respectively. The FIR filter interpolates the input data signal between input samples based on a selected coefficient set. The FIR filter is used because it provides a predictable change in response to a change in the coefficient set.

Prior to being input to the FIR filters 20 and 22, the I and Q data has been sampled at two samples per symbol and undergone analog-to-digital conversion to quantize the signal to eight bits. FIG. 2 shows in detail the elements for inphase symbol timing recovery. The elements of quadrature symbol timing recovery are the same as for the I component so a description of those elements will be omitted.

As shown in FIG. 2, FIR filter 20 contains a shift register 24 containing a plurality of flip-flops 24a–24k. The received data is input to the shift register 24 based on the finite impulse response. At each clock pulse the parallel output of the shift register is input to a plurality of multipliers 26a–26k corresponding to flip-flops 24a–24k. Multipliers 26a–26k multiply the output of the shift register 24 by a series of STR FIR coefficient $C_1$–$C_{11}$ stored in a plurality of ROMs. The number of ROMs corresponds to the number of flip-flops. The process of multiplying the shift register contents by finite impulse response coefficients, commonly called convolution, serves to shift the data from the shift register an amount indicated by the FIR coefficients. In an adder tree 28, each of the signals from multipliers 26a–26k are added to produce a filtered symbol $I_F$.

The STR FIR coefficients $C_1$–$C_{11}$, shown in Table 1 below, represent selected points along the sinc function. The coefficient ROMs of FIR filter 20 are shared with FIR filter 22.

TABLE 1

STR FIR Coefficients
COEFFICIENTS**

| Address* | C1 | C2 | C3 | C4 | C5 | C6 | C7 | C8 | C9 | C10 | C11 |
|---|---|---|---|---|---|---|---|---|---|---|---|
| 16 | 00 | 00 | 00 | 00 | 00 | 00 | 44 | 00 | 00 | 00 | 00 |
| 17 | 00 | 00 | 00 | 01 | FF | 04 | 43 | FD | 02 | 00 | 00 |
| 18 | 00 | 00 | 00 | 02 | FE | 09 | 42 | FA | 03 | 00 | 01 |
| 19 | 00 | 00 | 00 | 02 | FC | 0E | 40 | F8 | 04 | 3F | 01 |
| 20 | 00 | 01 | 00 | 03 | FA | 14 | 3D | F6 | 05 | 3F | 01 |
| 21 | 00 | 01 | 3F | 04 | F8 | 19 | 39 | F5 | 05 | 3E | 01 |
| 22 | 00 | 01 | 3F | 05 | F7 | 1F | 34 | F4 | 06 | 3E | 01 |
| 23 | 00 | 01 | 3F | 05 | F5 | 25 | 30 | F4 | 06 | 3E | 01 |
| 24 | 00 | 01 | 3E | 06 | F5 | 2A | 2A | F5 | 06 | 3E | 01 |
| 25 | 00 | 01 | 3E | 06 | F4 | 30 | 25 | F5 | 05 | 3F | 01 |
| 26 | 00 | 01 | 3E | 06 | F4 | 34 | 1F | F7 | 05 | 3F | 01 |
| 27 | 00 | 01 | 3E | 05 | F5 | 39 | 19 | F8 | 04 | 00 | 01 |
| 28 | 00 | 01 | 3F | 05 | F6 | 3D | 14 | FA | 03 | 00 | 01 |
| 29 | 00 | 01 | 3F | 04 | F8 | 40 | 0E | FC | 02 | 00 | 00 |
| 30 | 00 | 01 | 00 | 03 | FA | 42 | 09 | FE | 02 | 00 | 00 |
| 31 | 00 | 00 | 00 | 02 | FD | 43 | 04 | FF | 01 | 00 | 00 |
| 0 | 00 | 00 | 00 | 00 | 00 | 44 | 00 | 00 | 00 | 00 | 00 |
| 1 | 00 | 00 | 01 | FF | 04 | 43 | FD | 02 | 00 | 00 | 00 |
| 2 | 00 | 00 | 02 | FE | 09 | 42 | FA | 03 | 00 | 01 | 00 |
| 3 | 00 | 00 | 02 | FC | 0E | 40 | F8 | 04 | FF | 01 | 00 |
| 4 | 01 | 00 | 03 | FA | 14 | 3D | F6 | 05 | FF | 01 | 00 |
| 5 | 01 | 3F | 04 | F8 | 19 | 39 | F5 | 05 | FE | 01 | 00 |
| 6 | 01 | 3F | 05 | F7 | 1F | 34 | F4 | 06 | FE | 01 | 00 |
| 7 | 01 | 3F | 05 | F5 | 25 | 30 | F4 | 06 | FE | 01 | 00 |
| 8 | 01 | 3E | 06 | F5 | 2A | 2A | F5 | 06 | FE | 01 | 00 |
| 9 | 01 | 3E | 06 | F4 | 30 | 25 | F5 | 05 | FF | 01 | 00 |
| 10 | 01 | 3E | 06 | F4 | 34 | 1F | F7 | 05 | FF | 01 | 00 |
| 11 | 01 | 3E | 05 | F5 | 39 | 19 | F8 | 04 | FF | 01 | 00 |
| 12 | 01 | 3F | 05 | F6 | 3D | 14 | FA | 03 | 00 | 01 | 00 |
| 13 | 01 | 3F | 04 | F8 | 40 | 0E | FR | 02 | 00 | 00 | 00 |
| 14 | 01 | 00 | 03 | FA | 42 | 09 | FE | 02 | 00 | 00 | 00 |
| 15 | 00 | 00 | 02 | FD | 43 | 04 | FF | 01 | 00 | 00 | 00 |

*Address is in Decimal Notation
**Coefficient values are in HexaDecimal Notation In the preferred embodiment, the FIR coefficients span a range of plus or minus one symbol along the sinc function as the address value ranges from zero to plus or minus 16. Thus, the coefficients are addressable such that interpolation of the input data occurs with a resolution of $\frac{1}{16}$ symbol period. However, any number of address values can be selected.

Addresses from 1–15 are used to adjust received data having an advanced phase with respect to the demodulator clock, and addresses 16–31 are used to adjust received data that is delayed with respect to the demodulator clock. The farther the address is from the zero address, the farther the signal is out of phase.

These coefficients adjust the received data the needed amount based on the calculated phase error. As will be discussed in greater detail below, the FIR filter 20 tracking a phase offset will be driven such that the address generated will result in zero phase error when these addresses are used by the FIR filter 20.

The filtered signal $I_F$ from the FIR filter 20 is input to an S-Z splitter 30. For each received signal there are two data samples taken for each symbol—one representing the ideal values and the other representing the zero-crossing of the symbol. The sampling points $I_S$, $Q_S$, and the zero-crossings $I_Z$, $Q_Z$ respectively represent the actual data and the zero points of the FIR filter.

The $I_S$, $Q_S$ and $I_Z$, $Q_Z$ outputs of the FIR filter 20 are separated from the FIR output data sequence by the S-Z splitter 30. The S-Z splitter 30 eliminates one of the samples, preferably the zero-crossing, because only one is needed in order to perform phase correction. The decision as to which output is to be assigned S or Z status is determined by the clock enable generator 46 which generates an S clock enable (CESCE) for the selected symbol and a Z clock enable (CEZCE) for the zero-crossings. However, if the $I_Z$, $Q_Z$ pair is used as the selected sample, the phase error will simply be 180° out of phase and the appropriate correction will be made by the phase error detector. Under normal condition, every second output from the FIR is assigned S status, and FIR outputs lying in between S samples are assigned Z status.

The $I_S$, $Q_S$ pair from the S-Z splitter 30 is input to a hard decision module 32. The hard decision module 32 regenerates the transmitted bits used to modulate the carrier based on the amplitude of the I and Q components of the received carrier. In other words, the hard decision module 32 provides estimated bits which most closely match the actually data of the $I_S$, $Q_S$ pair.

The regenerated bits from the hard decision module 32 are input to a phase error detector 34. As shown in FIG. 2, the phase error detector 34 contains a register which stores the previous output from the hard decision module 32 and a plurality of lookup tables LUT1–LUT4. The lookup tables LUT1–LUT4 contain ideal I and Q values which are used to generated vectors representing the ideal I and Q values of the regenerated bits from the hard decision module 32. LUT1 contains the ideal $I_S$ values, and LUT 2 contains the negatives of the values of LUT1. LUT4 contains the ideal $Q_S$ values, and LUT3 contains the negative of the values in LUT4.

In the phase error detector 34, symbol timing phase error is detected by computing the value:

$$[I_S(new)-I_S(prev)]*I_Z+[Q_S(new)-Q_S(prev)]*Q_Z$$

where $I_S$ and $Q_S$ are the ideal I and Q values of the current symbol (new) and the previous symbol (prev) from lookup tables LUT1–LUT4, and $I_Z$ and $Q_Z$ are the zero-crossing samples from the output of the S-Z splitter 30. The outputs of LUT1 and LUT2 are added to produce the $I_S$ component of the above equation, and the outputs of LUT3 and LUT4 are added to produce the $Q_S$ component. The $I_S$ and $Q_S$ components are then multiplied by $I_Z$ and $Q_Z$ from the S-Z splitter 30 respectively to produce $I_{error}$ and $Q_{error}$. The sign and magnitude of $I_Z$ and $Q_Z$ effectively determine the polarity and magnitude of the error signal and the new and previous symbols are used to determine if a symbol transition has taken place. The $I_{error}$ and $Q_{error}$ are then combined into a phase error signal.

The phase error signal is input to a loop filter 36, which contains a programmable shifter 38 and an integrator 40. The purpose of the loop filter 40 is to filter the phase error signal to eliminate abrupt changes so the phase correction will be done in response to trends as opposed to abruptly correcting the signal is response to each small phase deviation.

The phase error signal is input to the programmable shifter 38. In the programmable shifter 38, implemented as a barrel shifter, a loop gain is applied and the phase error signal is shifted by the gain and sign extended appropriately. The phase error output of the programmable shifter 38 is added to the previous phase error stored in the register of the integrator 40 and the output of integrator centering control 44 (described below). This addition prevents abrupt changes in the phase error signal that is sent to the address generator 42.

In the case where the loop filter 36 is tracking a clock frequency offset, the loop filter output will rise (or fall) continuously, eventually reaching a point where it would over or underflow, i.e. reach the maximum or minimum address. Before this occurs, the integrator 40 of the loop filter 36 is offset to zero, causing the address to the coefficient ROMs to change towards zero as well. The output data sequence from the FIR filter is modified when this occurs, and the S or Z status of the FIR output samples needs to be modified accordingly.

The integrator centering control 44 is used to offset the integrator 40 and FIR filter address toward zero. The integrator centering control 44 has as its input the integrated phase error signal from the integrator register. The integrator centering control 44 monitors the integrated phase error bits and compares them to certain minimum and maximum values stored in a magnitude comparator (not shown) such that when the phase error bits reach a certain positive or negative magnitude the integrator centering control issues a center offset signal which is fed to the integrator adder and offsets the integrator 40 and the FIR filter address toward zero. Otherwise, the integrator centering control 44 outputs a zero value which has no effect on the operation of the loop filter 40.

Figure 3:
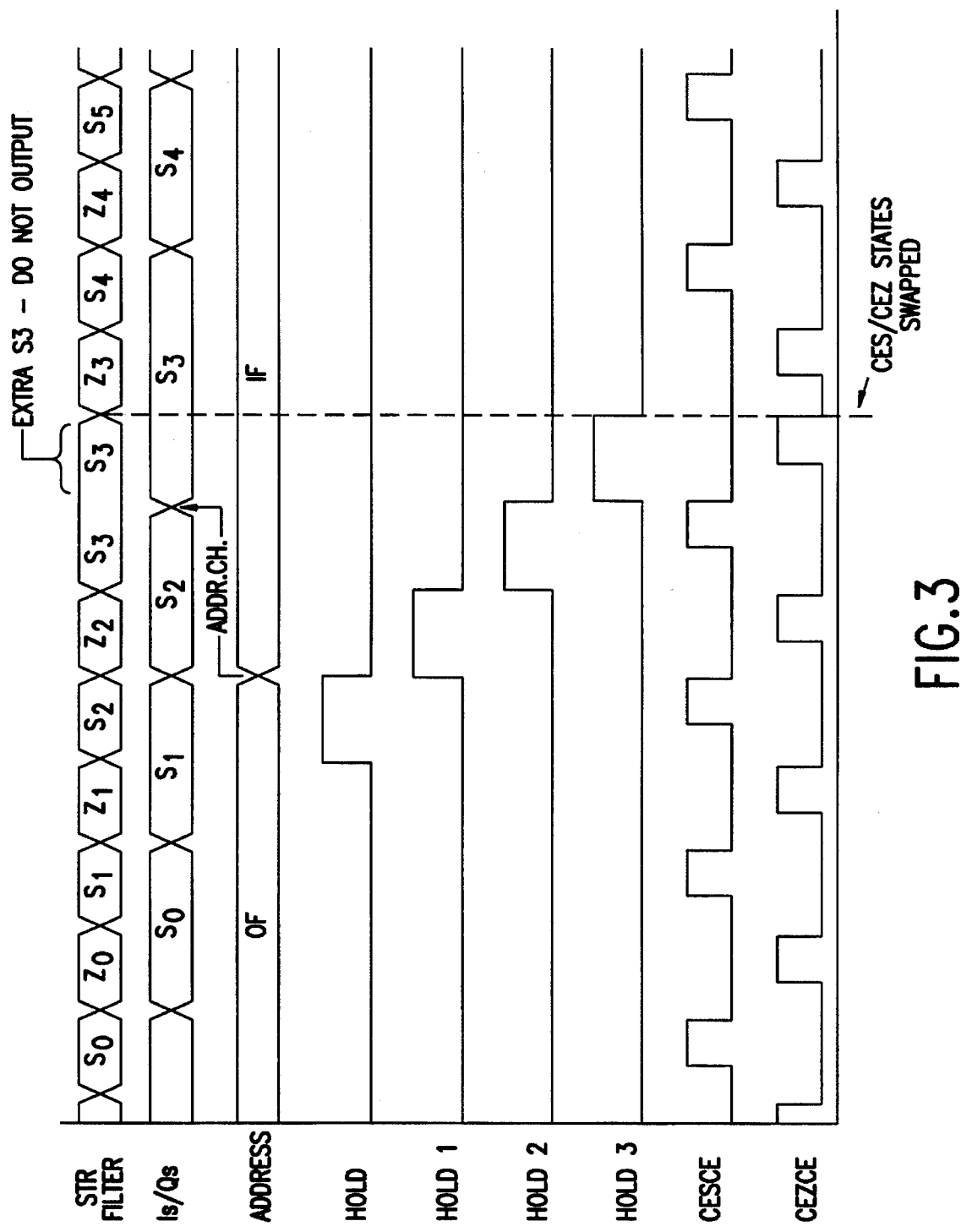
FIG. 3 is a timing diagram depicting symbol timing recovery phase negative alignment in accordance with this invention.

Turning now to the timing diagram of FIG. 3, if the address must be changed from a positive value toward zero, the filter output effectively repeats an S value as shown by the repeated $S_3$ value in the STR filter line of the diagram. This repeated $S_3$ value must not be allowed to leave the chip and so a clock enable Z (CEZCE) is used to suppress this value since symbols produce at CEZCE are normally indicative of zero-crossings which are ignored by the hard decision module 32. This extra CEZCE is a "hold" signal that prevents the repeated signal from being output to the filter. Thus, as shown in FIG. 3, HOLD 3 prevents the repeated $S_3$ from being input to the next stage. This type of positive alignment causes the peak of the convolution of the FIR filter to move from tap 5 (24e of FIG. 3) to tap 6 (24f of FIG. 3).

After the address change, the relative position of S and Z status samples is reversed as represented by the samples following the broken line in FIG. 3. Thus, the order of occurrence of the S and Z clock enables must be reversed using a clock enable generator 46.

Figure 4:
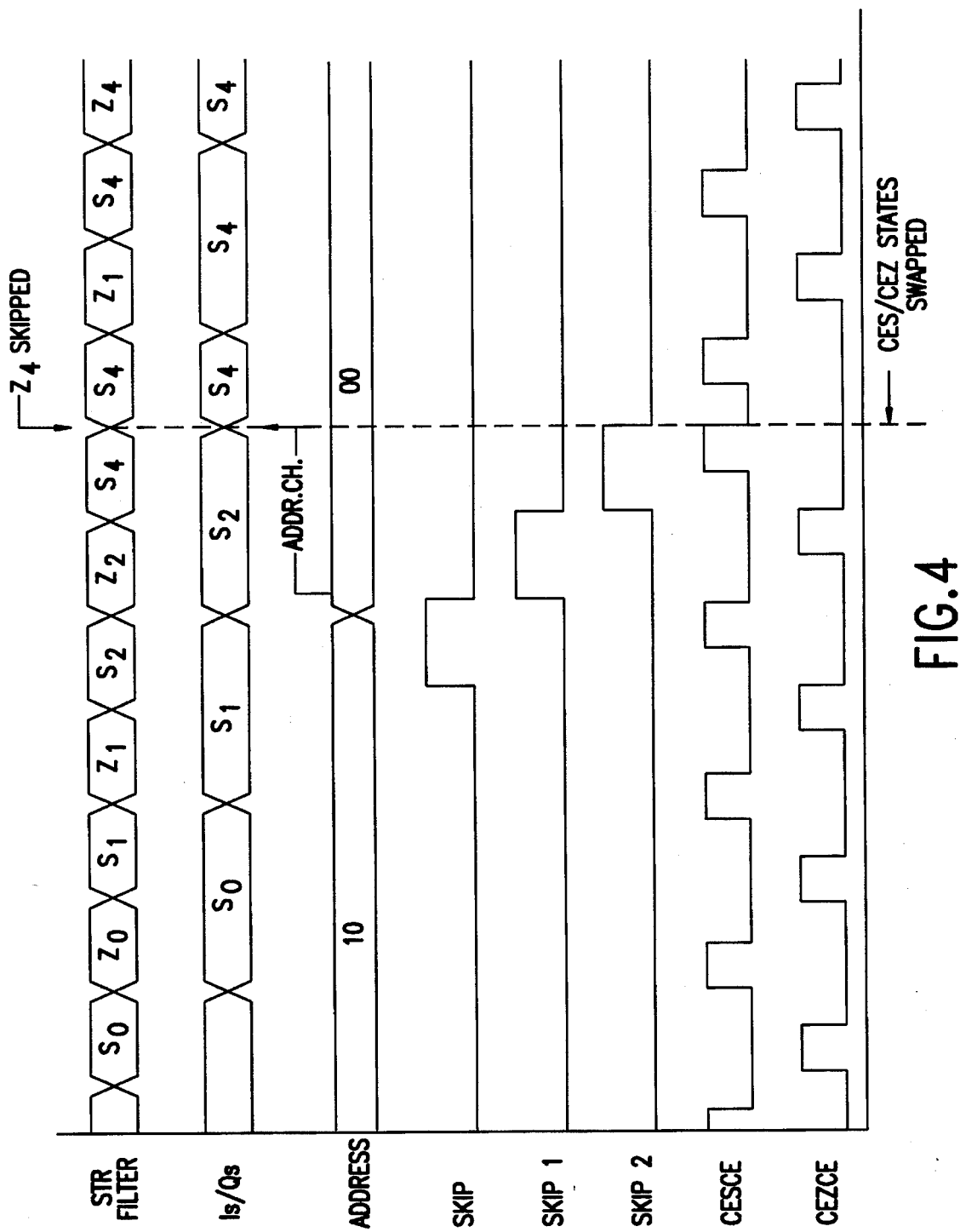
FIG. 4 is a timing diagram depicting symbol timing recovery phase positive alignment in accordance with this invention.

On the other hand, as shown in FIG. 4, if the address must be changed from a negative value toward zero, the filter output effectively skips over a Z value and outputs the next S value without an intervening Z value. As shown in FIG. 4, $S_3$ is followed immediately at the next clock pulse by $S_4$. This $S_4$ value must be allowed to leave the chip and so an extra clock enable (CESCE) for this value is generated. This extra CESCE is a "skip" signal which causes the next signal to be output at the next clock pulse. Therefore, as shown in FIG. 4, SKIP 2 causes successive signals $S_3$ and $S_4$ to be output at successive clock pulses.

Figure 5:
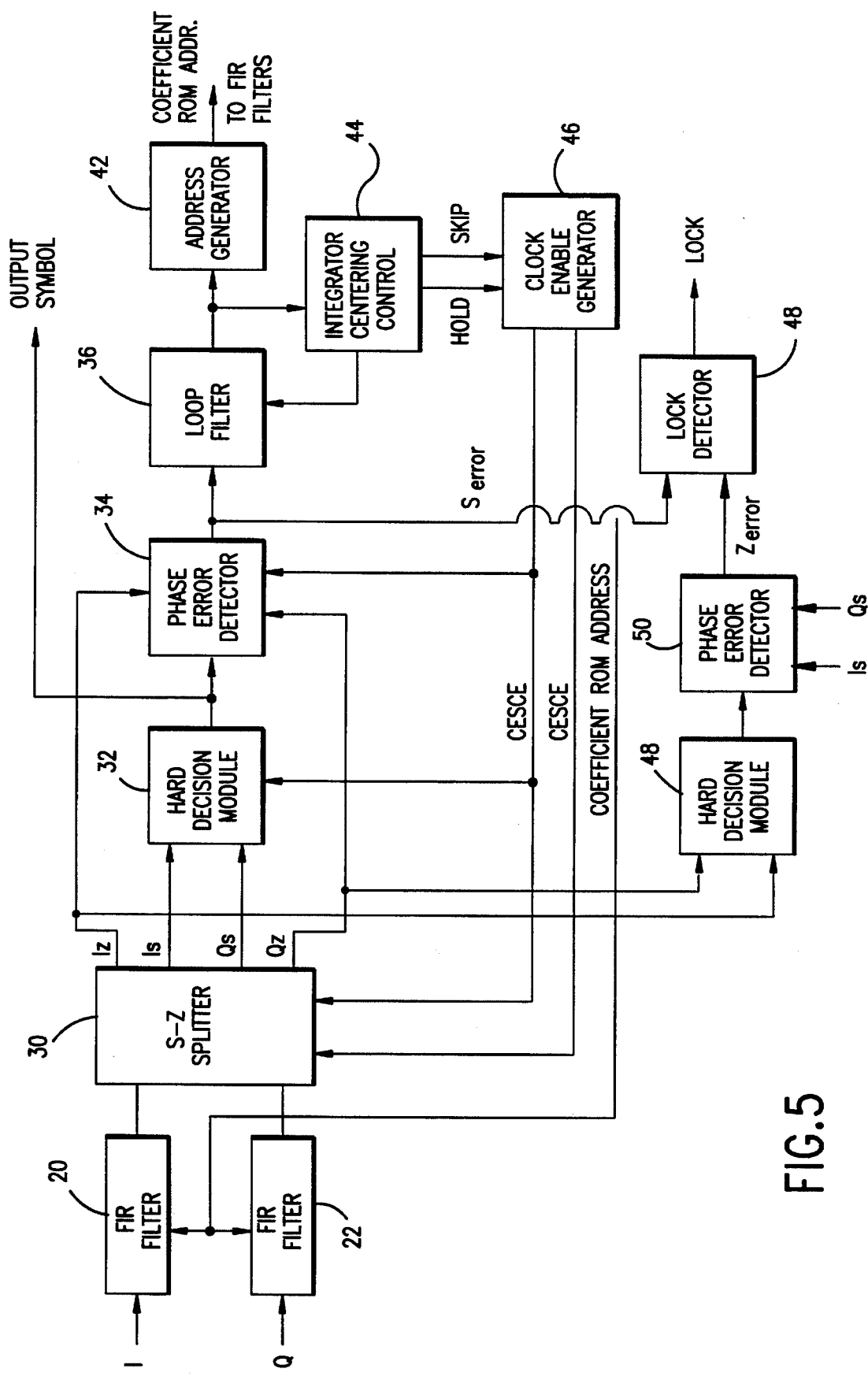
FIG. 5 is a block diagram of a symbol timing recovery device with a lock detector in accordance with another embodiment of this invention.

After the hold or skip signal is produced, the relative position of S and Z status samples is reversed and so the order of occurrence of the S and Z clock enables must be reversed as represented by the samples following the broken line in FIG. 5. Thus, the clock enable generator 46 swaps the CESCE and CEZCE states.

The phase error output of the loop filter 36 is input to an address generator 42. In the address generator, the top bits of the phase error signal are rounded to created address regions. These address regions are centered around the mean values of phase error which control the address generator 42. This rounded phase error is used to select which address line of Table 1 will be used for phase correction. Thus, the address regions create minimum and maximum threshold values that determine which coefficient address to use for phase correction based on the magnitude of the phase error.

In the preferred embodiment, the top 6 bits are rounded to 5 bits as representative of the most significant portion of the phase error signal, however any number of bits or the entire signal may be used for the purpose of address selection.

The address signal is sent from the address generator 42 to the FIR filter 20. In the FIR filter, the coefficients indicated by the address signal are used as $C_1$–$C_{11}$ to adjust the phase of the incoming data signal.

Variations on the embodiments described above are possible. For example, a lock detector can be added to the symbol timing recovery device of this invention. The output of the lock detector indicates whether the STR device is locked, i.e. reached a steady state for phase error correction.

As shown in FIG. 5, a hard decision module 48 and a phase error detector 50 process the $I_Z$ and $Q_Z$ pair received from the S-Z splitter 30 in the same manner as the $I_S$, $Q_S$ pair of FIG. 2 is processed by hard decision module 32 and phase error detector 34. The most significant bits of the resulting $Z_{error}$ from the phase detector 50 and $S_{error}$ from phase detector 34 are input to a lock detector 52. If the sampling points and the zero-crossings were correctly selected the $S_{error}$ should be small and the $Z_{error}$ should be large because it is 180° out of phase.

Figure 6:
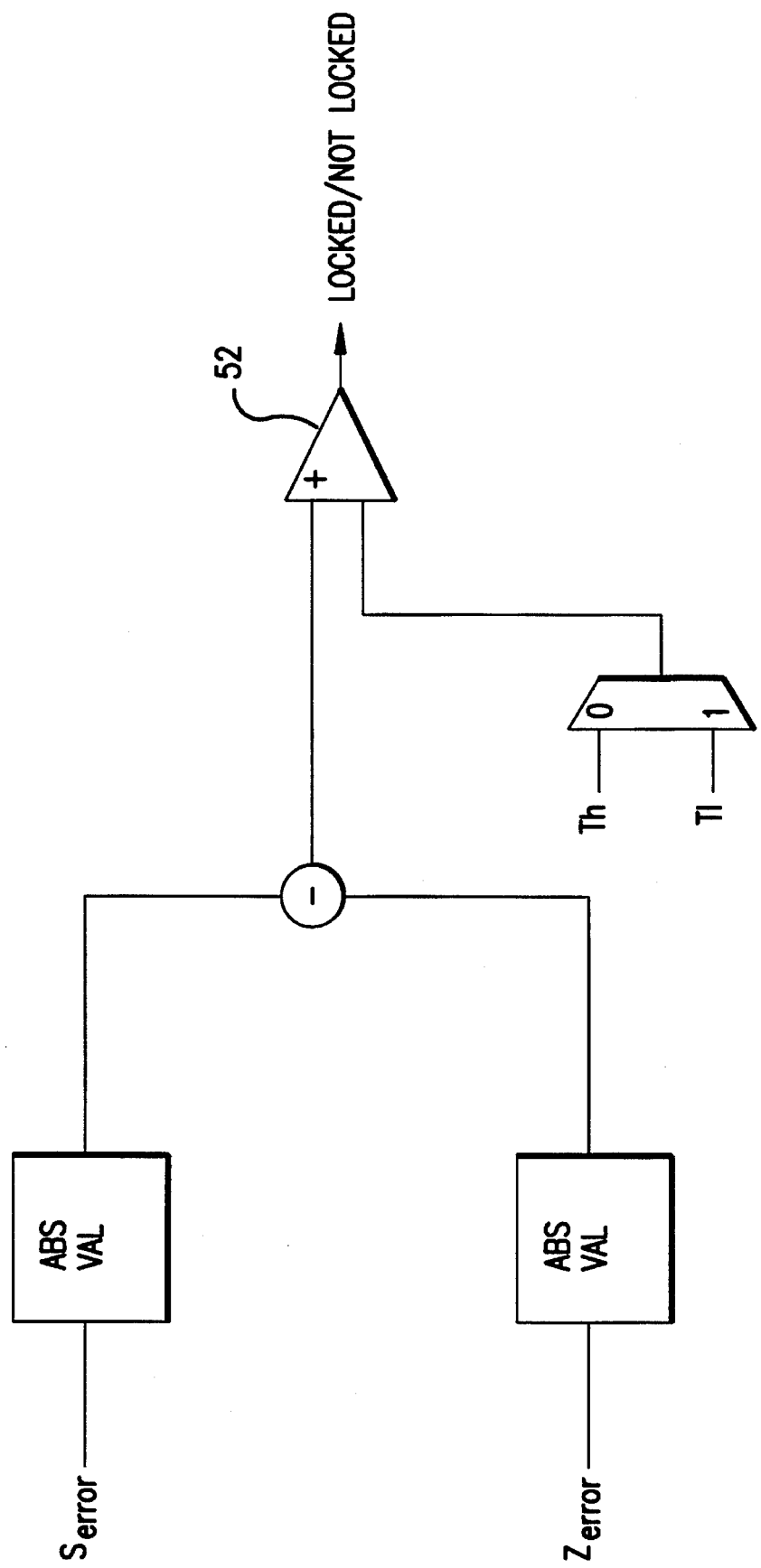
FIG. 6 is a functional diagram of the lock detector of FIG. 5.

As shown in FIG. 6, the lock detector determines the absolute values of the two signals and subtracts them. The difference between the absolute value of $S_{error}$ and $Z_{error}$ is compared to high and low threshold values Th and Tl which are also input a comparator 52. The lock state of the comparator is used to select which threshold is used for comparison. If the difference in the absolute values is greater than Th, the system is locked, else if the difference is less than Tl then the system is not locked. The locked/not locked signal provides status information of the STR that can be used to indicate system failures, indicate the need to reset, or other types of repair information.

The embodiments described above provide the advantage of the ability to operate over a virtually unlimited frequency range while maintaining a relatively simple construction. This invention is smaller, less complex, and less costly that an analog STR device of equivalent capability.

Of course it should be understood that a wide range of changes and modifications can be made to the preferred embodiment described above. It is therefore intended that the foregoing detailed description be regarded as illustrative rather than limiting, and that it be understood that it is the following claims, including all equivalents, which are intended to define the scope of the this invention.

What is claimed is:

1. A symbol timing recovery device comprising:

a data phase controller which receives and stores inphase and quadrature data;

a S-Z splitter for separating sampling points from zero points of said inphase and quadrature data;

a phase error detector which receives said inphase and quadrature data from said S-Z splitter, and detects polarity and magnitude of a phase error between said data and a receiver symbol clock; and a loop filter which selects, based on said phase error, a set of coefficients from a plurality of coefficient sets stored in said data phase controller, said loop filter controlling said data phase controller to adjust said received data based on said selected coefficients to align said received data with said receiver symbol clock.

2. The symbol timing recovery device of claim 1, further comprising:

an integrator centering control which monitors said phase error and resets said phase error and said selected set of coefficients to zero when said phase error reaches a specified value, said integrator centering control generating a hold or a skip signal to control the output of said data phase controller based on the direction of said coefficient reset; and a clock enable generator which produces a varying number of clock enable signals when said clock enable generator receives said hold or skip signal from said integrator centering control.

3. The symbol timing recovery device of claim 2, wherein said integrator centering control is reset to a midpoint when said phase error reaches specified maximum or minimum values.

4. A symbol timing recovery device comprising:

a data phase controller which receives and stores inphase and quadrature data;

a phase error detector which receives said inphase and quadrature data, and detects polarity and magnitude of a phase error between said data and a receiver symbol clock;

a loop filter which selects, based on said phase error, an address of a set of coefficients from a plurality of coefficient sets stored in said data phase controller, said loop filter controlling said data phase controller to align said received data with said receiver symbol clock based on said selected address;

an integrator centering control which monitors said phase error and resets said phase error and said selected address when said phase error reaches a specified value, said integrator centering control generating a hold or a skip signal to control the output of said data phase controller based on the direction of said address reset; and a clock enable generator which produces a varying number of clock enable signals when said clock enable generator receives said hold or skip signal from said integrator centering control.

5. The symbol timing recovery device of claim 4, wherein said data phase controller is a finite impulse response interpolator.

6. The symbol timing recovery device of claim 4, further comprising a S-Z splitter for separating sampling point from zero points of said inphase and quadrature signals.

7. The symbol timing recovery device of claim 6, further comprising:

a hard decision module for generating bits representing an estimation of said inphase and quadrature data sampling points; and wherein said phase error detector subtracts a current estimation of said inphase and quadrature data sampling point from a preceding estimation of said inphase and quadrature sampling point to produce an I component and a Q component, respectively, said phase error detector multiplying said I component by a current inphase zero-crossing point and said Q component by a current quadrature zero-crossing point and adding resulting values to create a phase error signal.

8. The symbol timing recovery device of claim 4, further comprising a lock detector for providing status information for said symbol timing recovery device.

9. A method of symbol timing recovery comprising the steps of:

storing a plurality of coefficient sets at addresses in a data phase controller;

receiving and storing inphase and quadrature data in said data phase controller;

separating said sampling points from said zero points of said inphase and quadrature data;

detecting polarity and magnitude of a phase error between said received data and a receiver symbol clock to produce a phase error signal;

selecting, based on said phase error signal, an address of a set of coefficients from said plurality of coefficient sets stored in said data phase controller; and aligning said received data with said receiver symbol clock based on said selected coefficients.

10. The method of claim 9, further comprising the steps of:

monitoring said phase error signal;

resetting said address to zero when said phase error signal reaches a specified value;

setting said phase error signal to zero when said phase error signal reaches a specified value; and producing a varying number of clock enable signals to generate a hold or a skip signal to control the output of said data phase controller upon resetting of said address.

11. The method of claim 9, further comprising the step of rounding said phase error signal to a specified number of significant bits prior to address selection to control said data phase controller.

12. The method of claim 9, further comprising the step of splitting the received inphase and quadrature data into sampling points and zero-crossing points prior to phase error detection.

13. The method of claim 12, wherein said phase error signal is determined by:

generating bits representing an estimate of said received inphase and quadrature data sampling points;

subtracting current inphase and quadrature data sampling point estimates from preceding inphase and quadrature to produce an I component and a Q component respectively;

multiplying said I component by an inphase zero-crossing point and said Q component by a quadrature zero-crossing; and adding said resulting I component and Q component to create a phase error signal.

14. The method of claim 12 further comprising the step of determining a sampling point phase error and a zero-crossing phase error to provide status information for said symbol timing recovery device.

* * * * *